United States Patent

[11] 3,633,343

[72] Inventor Walter J. Mark
 3044 Oregon Avenue, St. Louis Park,
 Minn. 55426
[21] Appl. No. 839,565
[22] Filed July 7, 1969
[45] Patented Jan. 11, 1972

[54] AUTOMOTIVE EXHAUST FILTER
 4 Claims, 4 Drawing Figs.
[52] U.S. Cl............................................... 55/316,
  55/323, 55/337, 55/498, 60/30
[51] Int. Cl...................................................... B01d 50/00
[50] Field of Search............................................ 55/DIG. 30,
  233, 260, 316, 321, 322–324, 329–337, 498;
  60/29, 30, 31

[56] References Cited
UNITED STATES PATENTS

| | | | |
|---|---|---|---|
| 360,441 | 4/1887 | Howes............................ | 210/304 |
| 1,411,606 | 4/1922 | Brereton ....................... | 55/457 |
| 1,522,111 | 1/1925 | Franck-Philipson ......... | 55/DIG. 30 |
| 2,189,704 | 2/1940 | Campbell...................... | 55/500 |
| 2,795,103 | 6/1957 | Jenison.......................... | 55/DIG. 30 |
| 2,846,021 | 8/1958 | Encinas......................... | 55/DIG. 30 |
| 3,061,416 | 10/1962 | Kazokas........................ | 55/323 |
| 3,434,599 | 3/1969 | Wischmeyer et al. ........ | 55/316 |
| 879,583 | 2/1908 | Pratt.............................. | 55/DIG. 30 |

*Primary Examiner*—Frank W. Lutter
*Assistant Examiner*—Bernard Nozick
*Attorney*—Williamson, Palmatier & Bains

ABSTRACT: A device for filtering and collecting noxious gases and particulate solids produced from the combustion of an internal combustion engine preferably in the form of a muffler or the like having a generally annular elongate housing provided with an inlet and outlet. The structure includes as an essential element a helical flow-directional member disposed axially through the housing for directing flow of exhaust gases and other products generally radially outwardly and forwardly. A filter sleeve medium surrounds the axially disposed helical member and is preferably of a predetermined substantially star cross-sectional shape extending longitudinally throughout the greater part of the length of the housing and delivering to a final secondary filter medium which includes replaceable transversely disposed elements through which exhaust gases must pass before being discharged from the device. The secondary filter medium, as well as the filter sleeve, is also preferably replaceable.

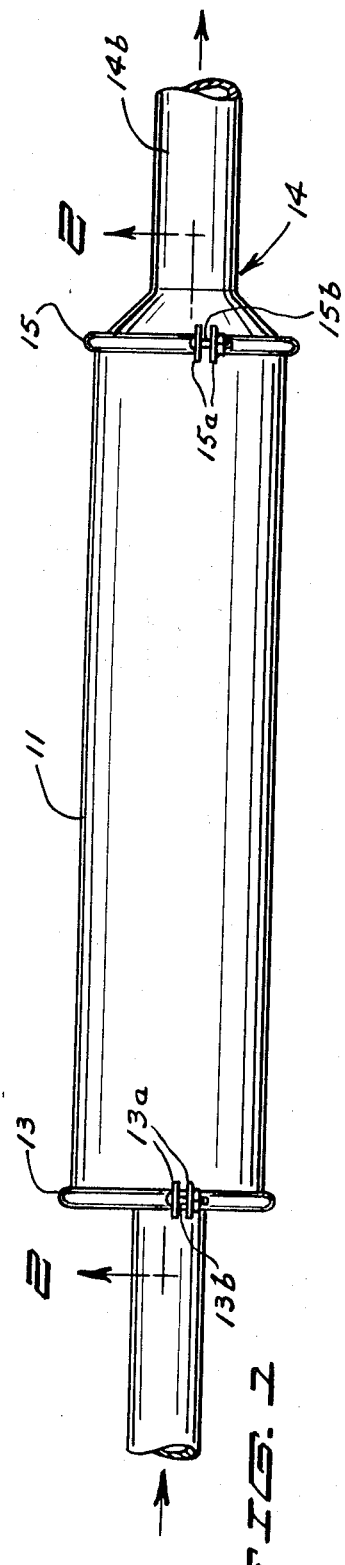
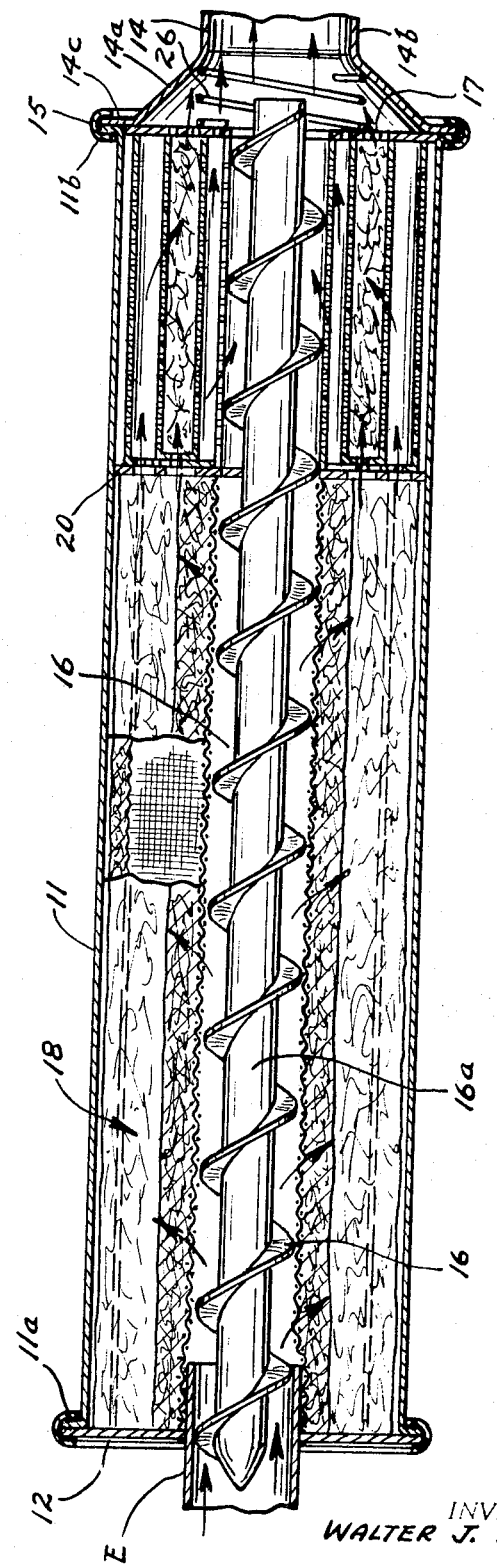

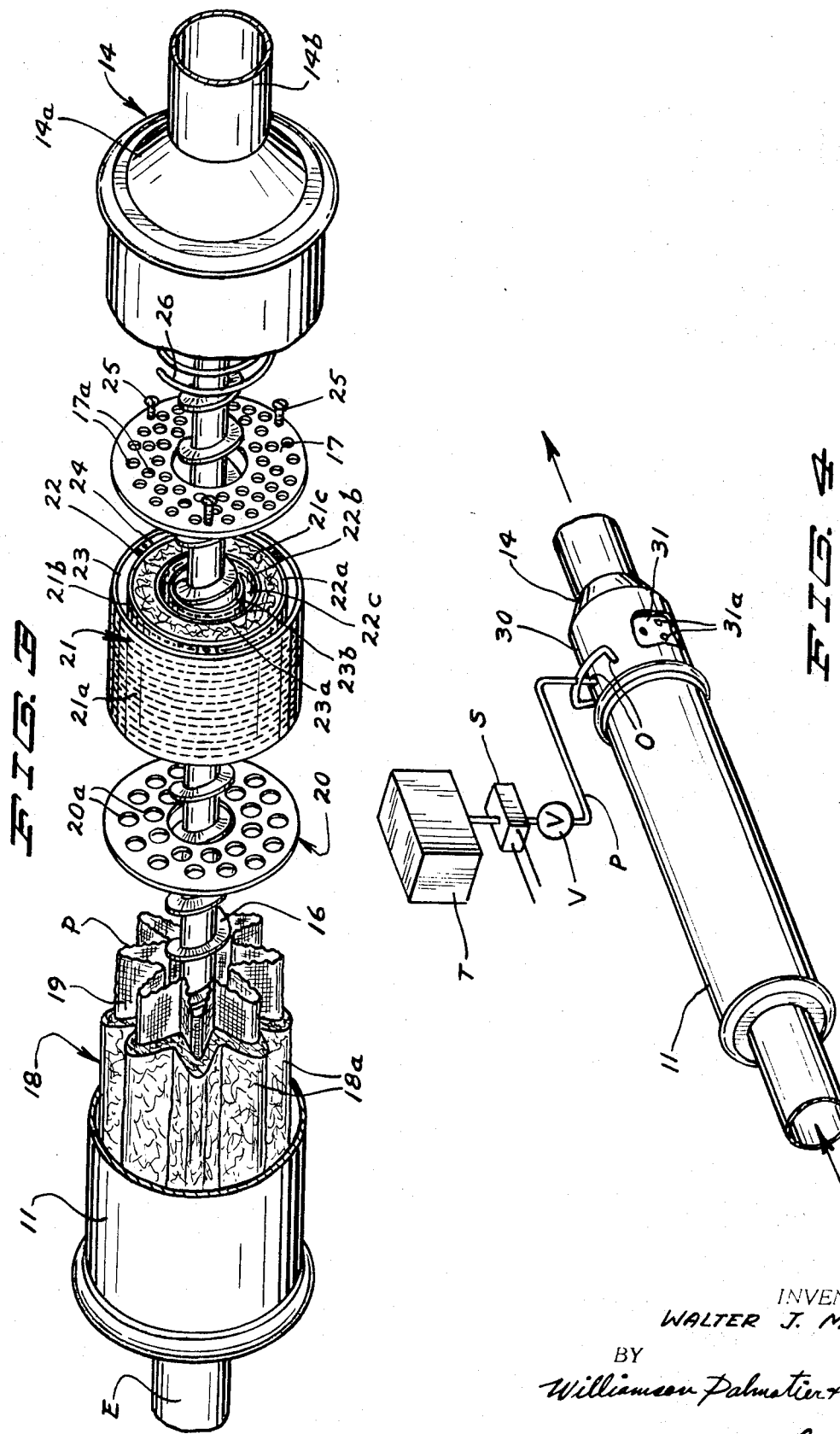

AUTOMOTIVE EXHAUST FILTER

This invention relates to a device or apparatus for filtering and collecting gaseous and solid particles resulting as products of combustion in internal combustion engines which include those of a diesel type.

In the operation of internal combustion engines such as are used in motor vehicles and trucks which employ as fuel a hydrocarbon, the combustion efficiency of the fuel-air mixture burned is relatively low, resulting in not only products of combustion, which include various combinations of oxygen, hydrogen, carbon and nitrogen, but also including in the products of combustion soot, dirt and other various solids in pulverulent or particle form, as well as raw fuel gases and harmful gases including carbon monoxide and carbon dioxide.

Pollution of air through the combustion of automotive fuels, as well as burning of other fuels in factories and for heating purposes, has become a most serious problem in the United States as well as numerous foreign countries. Not only do the millions of automobiles and trucks contribute materially to this pollution, but most buses, diesel engines on railroads and also employed in farm machinery, tractor and heavy construction and road machinery contribute heavily to this unfortunate situation. It is well established at the present time that the cumulative affect of the products of combustion from internal combustion engines is now a hazard to human health.

It is an object of my present invention to provide a fairly simple device which will filter off and collect most of the noxious gases and dirt and soot from the exhaust of an internal combustion engine.

A further object is the provision for a device of this kind which will also act as a muffler for the engine without increasing exhaust temperature and without production of back pressure during maximum collection of the filtered materials.

Another object of my invention is the provision of an apparatus or device of the class described wherein the several elements employed for filtering and collecting gaseous products, as well as soot and dirt, may be readily removed when loaded and replaced by new filtering elements.

A still further object of the invention is the provision of a device of the class described which may be manufactured at relatively low cost and which may be readily attached to existing motor vehicles and is adapted for use on all internal combustion vehicles and engines.

These and other objects and advantages of the invention will more fully appear from the following description made in connection with the accompanying drawings wherein like reference characters refer to similar parts throughout the several views and in which:

FIG. 1 is a top plan view of an embodiment of my invention showing at the left suitable connection with the exhaust from the exhaust manifold of an internal combustion engine;

FIG. 2 is a vertical section taken on the line 2—2 of FIG. 1 showing the internal constructions of two cooperating filtering and collection mediums;

FIG. 3 is an exploded view of said embodiment, the elongated housing being substantially foreshortened to economize on drawing space; and FIG. 4 is a perspective view in somewhat diagrammatical form of another embodiment of my invention.

Referring now to the embodiment illustrated in FIGS. 1 to 3 inclusive, the apparatus which functions to filter and collect products of combustion, as well as to muffle the noise of an internal combustion engine, is removably housed in a generally cylindrical, elongated housing 11 constructed of suitable material such as sheet metal and having, as shown, outturned attachment flanges 11a and 11b at the inner and outer open tubular ends thereof. The exhaust-receiving end is provided with a rigid closure and exhaust-receiving plate 12 having a peripheral edge which substantially registers with the flange 11a and having a central apertured portion for fitting the tubular exhaust E from the exhaust manifold of an internal combustion engine. Any suitable means may, of course, by used to additionally support the exhaust E. The circular closure plate 12 at its peripheral edge is removably secured to the flange 11a by suitable means such as a split-groove collar 13 employing, in conventional manner, upturned ends 13a which may be clamped together by a suitable clamping bolt 13b.

The outer or delivery end of housing 11 is removably connected with an exhaust tailpiece 14 having an enlarged outwardly tapered portion 14a and a tubular, reduced-diameter discharge portion 14b. A peripheral flange 14c with the tailpiece 14 substantially registers with the outturned annular attachment flange 11b of the housing and is secured detachably thereto in suitable manner by a split channel collar 15 having outturned opposed ends 15a which may be clamped together by a clamping bolt 15b. The tubular outer end 14b of the tailpiece is supported in any suitable conventional manner as by a metal strap from the bottom of the chassis of the engine or motor vehicle. From the foregoing it will be seen that the outer or delivery portion of the housing 11 may be readily disconnected from the tailpiece and dropped or moved to the side thereof to readily make accessible the removal of the numerous closely cooperating portions of the filter and flow-directing elements contained in housing 11. The components in close combination of the filtering components and flow-directing means are clearly shown in FIGS. 2 and 3 of the drawings. A generally helical flow-directional member 16 extends, as shown, the full length of housing 11 and is disposed axially and centrally thereof being removably but nevertheless fixedly supported as shown by the exhaust tube E at its inner end and by the apertured portion of a perforated closure disc 17. It will be understood that any generally helical flow-direction member may be employed whether it be a continuous helically arranged element mounted on a solid shaft or core or helically arranged spaced elements.

Extending throughout the greater portion of the length of housing 11 and concentrically related therewith is a generally tubular, preferably cross-sectionally star-shaped filter tube 18. This filter tube 18 is preferably of a star-shaped cross section symmetrically arranged with the axis of the flow-directing member 16 and housing 11 and comprising a series of tapered folds 18a forming radially disposed pockets P which are defined by filter sides which decrease in spaced-apart relation from the axial portion of the device to the peripheral portion thereof. In the embodiment shown the filter sleeve 18 is reinforced and supported upon a similarly shaped screen or grating, indicated in its entirety by the numeral 19, which may be constructed from such material as fine wire mesh or expanded metal and which, of course, has an external periphery adapted to smoothly interfit the inner periphery of the filter tube 18. It is to be understood that in lieu of a separate and slidably attachable filter member 18, of the shape illustrated or other generally tubular shapes, filtering material of the composition desired may be embedded in or formed as a coating on the supporting screen 19 and substantially integrally formed therewith. The filter material and ingredients or composition thereof is preferably noncombustible and may comprise such material as glass fibers alone or embedded or impregnated with particulate or fibrous chemicals, such as calcium carbonate, hydrated lime, calcium sulphate, activated carbon, vermiculite, aluminum or other shavings and the like. The composition and ingredients of the filter sleeve should be such as to have an affinity for absorbing and/or retaining or chemically being affected by gases such as carbon monoxide, common dioxide and the various gases which include the element nitrogen.

The filter sleeve 18 extends from the intake portion of the structure to an apertured disc partition 20 which is slidably mounted upon the peripheral portion of the flow-direction helix 16 and which has, as shown, two or more series of relatively large staggered apertures 20a formed therein with a large central aperture which accommodates the periphery of helical member 16.

A secondary and closely cooperating filter structure particularly constructed for collection of absorption of noxious gases and vapors occupies most of the space within housing 11 between disc partition 20 and the exhaust tailpiece 14.

The secondary filter structure, as shown, comprises a pair of coaxial spaced filter cylinders 21 and 22, respectively, suitably spaced apart to provide an annular passage 23 which communicates with a perforated end in the disc 17 which is provided with at least one series of communication apertures 17a for communication with the tailpiece 14. The inner periphery of the smaller filter cylinder 22 slidably fits the external periphery of the helical element 16 and the larger concentric filter cylinder 21 is spaced from cylinder 22 by any suitable means such as spacer lugs or pads 25 interposed between the inner periphery of the larger cylinder 21 and the external periphery of the smaller filter cylinder 22. The outer and larger filter cylinder 21 has its periphery, in use, spaced a short distance, approximating one-eighth of an inch, from the internal periphery of the housing 11.

The filter cylinders 21 and 22 may, of course, be constructed in a variety of different manners provided that the ingredients of the filter material or chemicals used are held and retained in a cylindrical form having high porosity. The materials for filtering and collection of the gases and vapors should have characteristics for affinity and/or absorption of exhaust gases, including oxides of nitrogen, and will comprise such ingredients as calcium chloride, slaked lime, glass fibers, aluminum and other metallic shavings or wool, vermiculite, calcium sulphate, mineral wool, and the like. The cylindrical filters may be molded in porous form, or screen or perforated metal frames may be made with the ingredients attached thereto.

In the forms of the invention shown, the larger filter cylinder comprises inner and outer cylindrical screens 21b and 21a respectively, constructed of stiff wire netting or expanded metal and having interposed therebetween the fibrous and particulate filter composition 21c. This composition may be made up of a matted bed of fibrous material, such as fiber glass, metal shavings or wool having dispersed or otherwise embedded therein the essential granular or particulate ingredients such as slaked lime, vermiculite, metal filings, steel wool, calcium sulphate, calcium chloride, sodium carbonate, activated carbon, or specified combinations thereof. Similarly, the smaller filter cylinder 22 may be constructed from two concentric sleeve or cylinders 22a and 22b of wire netting, or analogous material, between which is interposed the fibrous and granular filter chemicals forming the cylindrical element 22c. The cylindrical elements 21c and 22c may be preformed or, in any event, will preferably be at spots or areas at least adhered or bonded to one or both of the surrounding screens. A large diameter spiral spring 26 may be employed, interposed between the disc 17 and the frustoconical portion 14a of the tailpipe, to yieldingly prevent longitudinal movement and rattle of the parts in operation.

The right-hand perforated closure disc 17 is preferably secured to the assembled filter cylinders 21 and 22 by suitable means such as screws 24 which are threadedly embedded in the solid materials of the elements 21 and 22.

OPERATION

When the device or apparatus is operatively assembled as shown in FIGS. 1 and 2, all exhaust products from the internal combustion engine axially enter my filter and muffler apparatus through the tube E, as indicated by the arrows in FIG. 2. These products of combustion, through the inherent functions of the helical flow-direction member 16, are directed generally radially (centrifugally outwardly and forwardly) of the filter structure as indicated by other of the arrows on FIG. 2. A swirl or vortex is thus produced spiraling in its travel from left to right of the length of the filter apparatus. The pulverulent and granular particles, such as carbon, soot and minute and larger globules of vapor and moisture, through the action of centrifugal force will have greater trajectories than the purely gaseous substances and consequently, in the vortex produced, will penetrate farther into the pockets P of the primary filter 18 and will rub and strike against various areas of the interior of filter pockets P, being for the most part retained and/or absorbed thereby. The gaseous products in the vortex will of course also impinge against areas of the filter pockets and having chemical affinity for various ingredients of the filter will be to a very considerably extent collected, absorbed and/or chemically united with ingredients of the filter. It will be understood that with increased speed on the internal combustion engine the vortex tendencies of the exhaust combustion materials will be increased in diameter and that trajectories of particles of both solid and fluid materials will cause deeper penetration of the products of combustion into the pockets P.

It should also be pointed out that between the folds 18a of the generally star-shaped cross-sectional filter 18, are large areas extending longitudinally of the filter wherein filtered air and gaseous substances, passing through the filter may progress and move forwardly longitudinally within the housing 11.

The primary filtering process continues up and to the apertured partition disc 20 which is disposed at a short distance inwardly of the tailpiece 14 (say from one-sixth to one-fourth) of the total length of housing 11. Thereafter filtered and other products of combustion, by then mostly gases and air, pass through the two series of staggered relatively large apertures 20a and are thereafter efficiently processed by the cylindrical filters 21 and 22 and their relation with the intervening cylindrical passage 23. The outer series of ports or passages 20a communicate with the inner end of the filter element 21 while the inner series of apertures 20a communicate preferably on a division line between the open cylindrical passage 23 and cylindrical filter element 22. The aggregate or sum of the areas of the passages 20a should at least equal, and preferably somewhat exceed, the total area of the entrance tube E so that there will be no buildup of back pressure or notable increase in temperature throughout the entire length of my filtering apparatus.

The products of combustion passing through the apertures 20a of the disc partition 20 impinge against and pass through in many instances the porous materials of the two cylindrical filters 21 and 22 and here particularly gases and volatile vapors are absorbed, collected and in many instances chemically united with some of the chemical filter ingredients. It should be pointed out that the carbon dioxide, carbon monoxide and water vapors remaining, as well as the oxygen gases of nitrogen and the ($NH_3$) ammonia gases, are absorbed and retained by the hydroscopic properties of certain of the ingredients and combined chemically with other ingredients and are retained to prevent ultimate discharge thereof.

In passage through and impingement against the porous filters 21 and 22, there will be no buildup of back pressure in the gaseous stream due to the fact that the cross-sectional area of the annular space 23 between the filters is itself greater than the cross-sectional area of the intake exhaust pipe E. Furthermore, additional impingement of exhaust gases against the exterior of filter 21 occurs on the periphery of this filter since such periphery is spaced a short distance form the actual filter housing 11. The foregoing fact has been determined by careful tests made within a wide range of speeds of the internal combustion engine wherein my apparatus has been applied. Careful tests have also been made for soot, stain, and increased weight of the filter elements after many miles of driving of an automotive vehicle equipped with my improved filter apparatus. Such tests have successfully shown that substantially no soot, stain or dirt is discharged from the tailpiece 14 of my device after an equivalency of 2,000 miles of driving of the automotive vehicle. It has been found that the presence of hydrocarbon and nitrogen oxides in the atmosphere, under sunlight and during certain weather conditions, is mainly responsible for smog over the city of Los Angeles, California and in other areas of the nation including Chicago, Illinois. My filtering apparatus removes a very great percentage of the gases which would otherwise result in exhaust from the combination of hydrocarbons and nitrogen oxides.

In FIG. 4, I diagrammatically show another form of my invention where the housing 11, of the structure is transversely split to form a combination tailpiece 14, and housing 30 for a pair of spaced, coaxial cylindrical filter elements 31. The outer filter element 31 has apertures 31a formed therethrough for communication of liquid by gravity with the exterior of the inner filter element 31 (not shown). The cylindrical filter members 31 are porous and spongelike to absorb liquid.

A tank T for containing liquid having an affinity for absorbing gases including the oxides of carbon, hydrocarbon fuels and the oxides of nitrogen, is suitably mounted from the firewall or other convenient upstanding wall under the hood of an automotive vehicle above my filter apparatus. A solenoid mechanism S controls valve V in the discharge pipeline P which communicates at its lower end with a plurality of discharge orifices O which extend through the upper portion of housing section 30 in communication with the upper portion of the periphery of the outer cylindrical filter member 31. The electrical circuit to the solenoid is connected whenever the internal combustion motor is started so that there will be a slow and substantially metered flow of the liquid from tank T into spaced points on the top of the absorbent cylindrical filter 31.

It will be understood that the filtering media employed in the main portion 11 of the exhaust housing may be identical to that shown in the form first described, and the concentric relations of the filter elements 31 spaced apart, may be substantially identical to the arrangement and positioning of the filter elements 21 and 22 in the form first described. The tank T may contain liquid mixtures in emulsified or solution form, of slaked lime, calcium carbonate, sodium carbonate, calcium sulphate in aqueous mixture and in various combinations or proportions, all of which have affinity for combining with or retaining certain of the gases formed by products of explosion of hydrocarbon fuel.

The operation of the form shown in FIG. 4 is substantially identical with that of the form illustrated in FIGS. 1 to 3 of the drawings.

With the foregoing description it will be seen that I have conceived and provided a very highly efficient filter and collecting apparatus for the products of combustion of various types of internal combustion engines, which also in its preferred form, acts as a silencer or muffler for the exhaust noises, and which through a multiplicity of impingements of the exhaust products with numerous absorbent, filtering and collection elements, provide an ultimate discharge stream of air substantially free from soot, dirt, hydrocarbon vapors, and gaseous products of combustion.

What is claimed is:

1. A device for filtering and collecting noxious substances from the products of combustion of an internal combustion engine having in combination, a tubular, elongate housing having a reduced inlet connected with the exhaust of said engine and having a reduced outlet, a helical flow-direction member including helical vane means disposed axially and centrally through substantially the length of said housing and defining an axial passage directing gas flow generally forward, and particulate matter centrifugally outward and radially thereof, said helical member having communication at one end with the reduced inlet and at the other end with the reduced outlet of said housing, an elongate porous filter enclosure mounted axially and concentrically of said helical member in surrounding relation thereto within said housing and extending through the greater part of the length thereof from said inlet said filter enclosure having a cross-sectional configuration of generally star shape and providing a plurality of elongate radially extending filter pockets having open entrances positioned circumferentially in close adjacent relation to the periphery of said helical member and receiving therefrom particulate and some gas said filter enclosure having stiffening means for retaining and supporting the filter enclosure with external surfaces of said pockets in spaced relation to the wall of said housing to define longitudinal passage means for filtered air and means conveying filtered air to said outlet 2. The structure and combination defined in claim 1 wherein, said filter enclosure terminates some distance short of the outlet end of said housing and wherein said filter enclosure has open ends auxiliary filtering media interposed between said terminating end of said filter enclosure and the outlet of said housing comprising a reinforced porous annular filter extending concentrically in spaced relation with the interior of said housing and with the periphery of said flow direction member and having communication at its forward end with the rear ends of said pockets and having also communication for receiving centrifugally and radially, material from the rear portion of said flow direction member, the outer end of said annular filter also having communication with the reduced outlet of said housing.

3. The structure and combination defined in claim 1 wherein, said filter enclosure comprises a stiff, reinforcing netting having a cross-sectional configuration of substantially star shape, and means for removably mounting said netting from the ends thereof within said tubular housing, and said filter enclosure comprising a layer of porous, absorbent filtering material substantially covering said netting and supported thereby, said netting, with said covering, being longitudinally removable through an end of said housing.

4. The structure and combination set forth in claim 3 wherein, said porous filter material of said layer is selected from the group consisting of calcium sulphate, activated carbon, shavings and fibers of the metals aluminum, iron and copper, and calcium carbonate.

\* \* \* \* \*